(12) United States Patent
Parsons

(10) Patent No.: US 7,199,709 B2
(45) Date of Patent: Apr. 3, 2007

(54) CART FLEET MANAGEMENT SYSTEM

(75) Inventor: Natan E. Parsons, Brookline, MA (US)

(73) Assignee: Arichell Technologies, Inc., West Newton, MA (US)

( * ) Notice: Subject to any disclaimer, the term of this patent is extended or adjusted under 35 U.S.C. 154(b) by 552 days.

(21) Appl. No.: 10/310,615

(22) Filed: Dec. 4, 2002

(65) Prior Publication Data
US 2003/0102969 A1    Jun. 5, 2003

Related U.S. Application Data

(60) Provisional application No. 60/337,112, filed on Dec. 4, 2001.

(51) Int. Cl.
*G08B 1/08* (2006.01)

(52) U.S. Cl. .............. 340/539.13; 340/568.5; 340/988; 340/674

(58) Field of Classification Search ........... 340/539.13, 340/568.5, 988, 674, 572.1, 5.91; 235/381, 235/385, 383; 905/22, 28; 194/211, 213, 194/905

See application file for complete search history.

(56) References Cited

U.S. PATENT DOCUMENTS

| | | | |
|---|---|---|---|
| 2,799,514 A | 7/1957 | Kramcsak, Jr. ............... 280/29 |
| 4,218,763 A | 8/1980 | Kelley et al. ................. 340/65 |
| 4,284,973 A | 8/1981 | Howell et al. ............... 340/65 |
| 4,381,870 A | 5/1983 | Muellner ................. 280/33.99 |
| 4,532,710 A | 8/1985 | Kinney et al. ............... 33/141 |
| 4,549,182 A | 10/1985 | Gillet ......................... 340/942 |
| 4,651,156 A | 3/1987 | Martinez .................... 342/457 |
| 4,680,454 A | 7/1987 | Zeaman et al. ............... 235/95 |
| 4,733,877 A | 3/1988 | Pastien ................... 280/33.99 |
| 4,747,180 A | 5/1988 | Screen .......................... 16/34 |
| 4,862,486 A | 8/1989 | Wing et al. ................... 377/16 |
| 4,868,544 A | 9/1989 | Havens .................... 340/568.5 |
| 4,986,596 A | 1/1991 | Gohier .................... 296/203.1 |
| 5,040,265 A | 8/1991 | France et al. ................. 16/35 |
| D319,906 S | 9/1991 | Takahashi et al. ........... D34/19 |
| 5,180,045 A | 1/1993 | Sonnendorfer et al. ..... 194/212 |
| 5,194,844 A | 3/1993 | Zelda ......................... 340/426 |
| 5,357,182 A | 10/1994 | Wolfe et al. ................ 318/379 |
| 5,371,923 A | 12/1994 | Chang ..................... 16/113.1 |
| 5,400,472 A | 3/1995 | Chang .......................... 16/115 |
| 5,402,106 A | 3/1995 | DiPaolo et al. ........... 340/568.5 |
| 5,432,412 A | 7/1995 | Harris et al. ................... 319/3 |
| 5,438,319 A | 8/1995 | Zeytoonjian et al. ....... 340/571 |
| 5,450,650 A | 9/1995 | Bertrand et al. ............... 16/35 |
| 5,458,020 A | 10/1995 | Wang .......................... 74/527 |
| 5,490,688 A | 2/1996 | Cheng ........................ 280/655 |
| 5,516,127 A | 5/1996 | Glazer et al. .......... 280/33.994 |
| 5,560,626 A | 10/1996 | Glazer et al. .......... 280/33.994 |
| 5,579,857 A | 12/1996 | Abe et al. .................... 180/8.2 |
| 5,586,775 A | 12/1996 | Cheng .......................... 280/38 |
| 5,592,180 A | 1/1997 | Yokev et al. ............... 342/450 |
| 5,598,144 A | 1/1997 | Lace .......................... 340/568 |

(Continued)

*Primary Examiner*—Anh V. La
(74) *Attorney, Agent, or Firm*—Ivan David Zitkovsky

(57) ABSTRACT

A hand-operated cart constructed for carrying luggage or packages includes a frame including a cargo area, and cart wheels connected to the frame and connected to a handrail arranged for manually displacing the cart. The cart also includes a distance sensor constructed and arranged to measure a travel distance of the cart, an interface unit and a processor constructed to receive travel distance data from the distance sensor.

40 Claims, 5 Drawing Sheets

U.S. PATENT DOCUMENTS

| | | | |
|---|---|---|---|
| 5,610,584 A * | 3/1997 | Schrade | 340/568.5 |
| 5,646,616 A | 7/1997 | Komatsu | 340/988 |
| 5,670,872 A | 9/1997 | Van De Walle et al. | 324/171 |
| 5,685,385 A | 11/1997 | Sanuga | 180/65.1 |
| 5,749,589 A | 5/1998 | Hopkins et al. | 280/47.34 |
| 5,797,611 A | 8/1998 | Joseph et al. | 280/33.991 |
| 5,836,596 A | 11/1998 | Wanzl | 280/33.991 |
| 5,883,598 A | 3/1999 | Parl et al. | 342/457 |
| 5,890,068 A | 3/1999 | Fattouche et al. | 455/456 |
| 5,895,436 A | 4/1999 | Savoie et al. | 701/214 |
| 5,917,405 A | 6/1999 | Joao | 340/426 |
| 5,922,040 A | 7/1999 | Prabhakaran | 701/117 |
| 6,024,203 A | 2/2000 | Amdahl et al. | 194/213 |
| 6,029,982 A | 2/2000 | Kakehi et al. | 280/5.2 |
| 6,102,414 A | 8/2000 | Schweninger | 280/33.994 |
| 6,125,972 A | 10/2000 | French et al. | 194/205 |
| 6,125,985 A | 10/2000 | Amdahl et al. | 194/205 |
| 6,126,176 A | 10/2000 | Eguchi et al. | 280/5.2 |
| 6,131,936 A | 10/2000 | Eguchi et al. | 280/339.4 |
| 6,142,283 A | 11/2000 | Amdahl et al. | 194/205 |
| 6,161,849 A | 12/2000 | Schweninger | 280/33.994 |
| 6,198,935 B1 | 3/2001 | Saha et al. | 455/456 |
| 6,204,772 B1 | 3/2001 | DeMay et al. | 340/686.1 |
| 6,206,165 B1 | 3/2001 | Lenander | 195/213 |
| 6,224,068 B1 | 5/2001 | Eguchi et al. | 280/5.2 |
| 6,244,366 B1 | 6/2001 | Otterson et al. | 180/11 |
| 6,249,987 B1 | 6/2001 | Gorfu | 33/781 |
| 6,250,451 B1 | 6/2001 | Thirkill | 194/205 |
| 6,271,755 B1 | 8/2001 | Prather et al. | 340/568.5 |
| 6,378,684 B1 * | 4/2002 | Cox | 194/213 |
| 6,486,768 B1 * | 11/2002 | French et al. | 340/5.92 |
| 6,659,344 B2 * | 12/2003 | Otto et al. | 235/381 |

* cited by examiner

CART FLEET MANAGEMENT SYSTEM

This application claims priority from U.S. Provisional Application No. 60/337,112, filed on Dec. 4, 2001, which is incorporated by reference.

The present invention relates to locating and managing luggage carts or shopping carts.

BACKGROUND OF THE INVENTION

Hand-operated luggage carts and shopping carts (push carts) have been widely used in airports, train stations, shopping centers and other commercial complexes. In airports, luggage carts have become very popular by travelers transporting luggage to and from planes and ground transportation. A large public airport (or another facility) requires hundreds or thousands of carts to satisfy the demands of travelers. Luggage carts may also become a nuisance at the airport since many customers do not return the carts to a collection area after using them. Unreturned carts can even be a safety hazard to pedestrian and motor traffic.

Furthermore, if there are many escalators, it is very convenient if a person using the cart can move up or down on the escalator together with the cart. However, in a middle section of the escalator, the inclination creates a large level or height difference between adjacent steps. Therefore, the cart located on an inclined section of the escalator tends to move due to the forces of gravity. The cart may move with respect to the escalator and fall. The movement of the cart is difficult to avoid given the inclined structure of the escalator. However, various designs for carts suitable for escalators have been provided in U.S. Pat. Nos. 5,516,127, 6,126,176; and 6,131,936, all of which are incorporated by reference.

Shopping carts have also become necessary items of equipment for large modern stores and supermarkets. A shopper utilizes a shopping cart to transport items to be purchased. Then, a shopper passes a shopping cart through a checkout stand carrying purchased goods to a vehicle parked at the exterior of the market or mall. Unfortunately, many shopping carts are damaged in the process and at a parking area, or are stolen therefrom.

There are several theft prevention systems described in U.S. Pat. Nos. 3,002,370; 3,475,036; 3,590,962; 3,394,945; 3,892,295; 4,524,985; 4,577,880; 4,772,880; 4,868,544; 5,194,844; and 5,432,412 all of which are incorporated by reference.

Due to the nature of use and the large number of luggage carts used at airports, and shopping carts at modern malls and supermarkets, there is a need to locate the carts. Furthermore, there is a need to maintain properly the carts to prevent their break down (and even possible injuries caused by a cart break down).

SUMMARY OF THE INVENTION

The present invention is directed to an apparatus and method for locating and managing luggage carts or shopping carts.

According to one aspect, a hand-operated cart constructed for carrying luggage or packages includes a frame including a cargo area, and cart wheels connected to the frame and connected to a handrail arranged for manually displacing the cart. The cart also includes a distance sensor constructed and arranged to measure a travel distance of the cart, an interface unit and a processor constructed to receive travel distance data from the distance sensor.

Preferred embodiments of this aspect may include one or more of the following features: The hand-operated cart may include a direction sensor constructed and arranged to detect a travel direction of the cart. The distance sensor is coupled to one of the wheels and arranged to measure the travel distance based on rotation of the wheel. The distance sensor includes a reed sensor mounted on the wheel. The direction sensor includes a rotary encoder operatively connected to one of the wheels.

The hand-operated cart further includes a gate sensor cooperatively arranged with a gate marker located at a fixed location. The gate sensor provides to the processor gate data corresponding the fixed gate location based on a signal from the gate marker. The gate marker emits an optical signal detected by the gate sensor located on the cart. The gate marker emits an electromagnetic signal detected by the gate sensor located on the cart.

The hand-operated cart further includes an identifier associated with the cart and cooperatively arranged with a gate scanner located at a fixed location and constructed to register proximity of the cart at the fixed location. The identifier may include a bar code. The identifier may include a magnet. The interface unit includes a transmitter. The transmitter may be an RF transmitter. The transmitter may be an optical transmitter (e.g., IR transmitter).

According to another aspect, a system for managing multiple carts constructed for carrying luggage or packages includes multiple carts, where each cart includes a frame having a cargo area, cart wheels connected to the frame and connected to a handrail arranged for manually displacing the cart, a distance sensor constructed and arranged to measure a travel distance of the cart, an interface unit, and a processor constructed to receive travel distance data from the distance sensor. The system also includes several base units arranged to receive data from the interface unit; and a computer system interfaced with the base units and arranged to manage use of the carts.

According to another aspect, a system for scheduling maintenance of carts constructed for carrying luggage or packages, includes multiple carts, each including an interface unit, a processor and a usage sensor, and there are several base units arranged to receive usage data from the interface unit. Each cart has a frame providing a cargo area, cart wheels connected to the frame and connected to a handrail arranged for manually displacing the cart. The usage sensor is constructed and arranged to measure the usage of the cart, and the processor is constructed to receive usage data from the usage sensor.

Preferred embodiments of this aspect may include one or meore of the following features: The scheduling of maintenance using a usage sensor that includes a load sensor and a displacement sensor. The displacement sensor includes a distance sensor and a direction sensor. The displacement sensor further includes a gate sensor cooperatively arranged with a gate marker located at a fixed position at the area. Receiving date by the usage signal may include receiving distance data corresponding to a travel distance of the cart over a selected time period. Receiving by the usage signal may include receiving load data corresponding to a load carried on the cart over a selected time period. The load data may include weight of the load.

The displacement sensor may be constructed to transmit a signal to a remote location. The displacement sensor may be constructed to transmit a signal to several remote locations arranged to determine a location of the cart.

DESCRIPTION OF PREFERRED EMBODIMENTS

Figure 1:
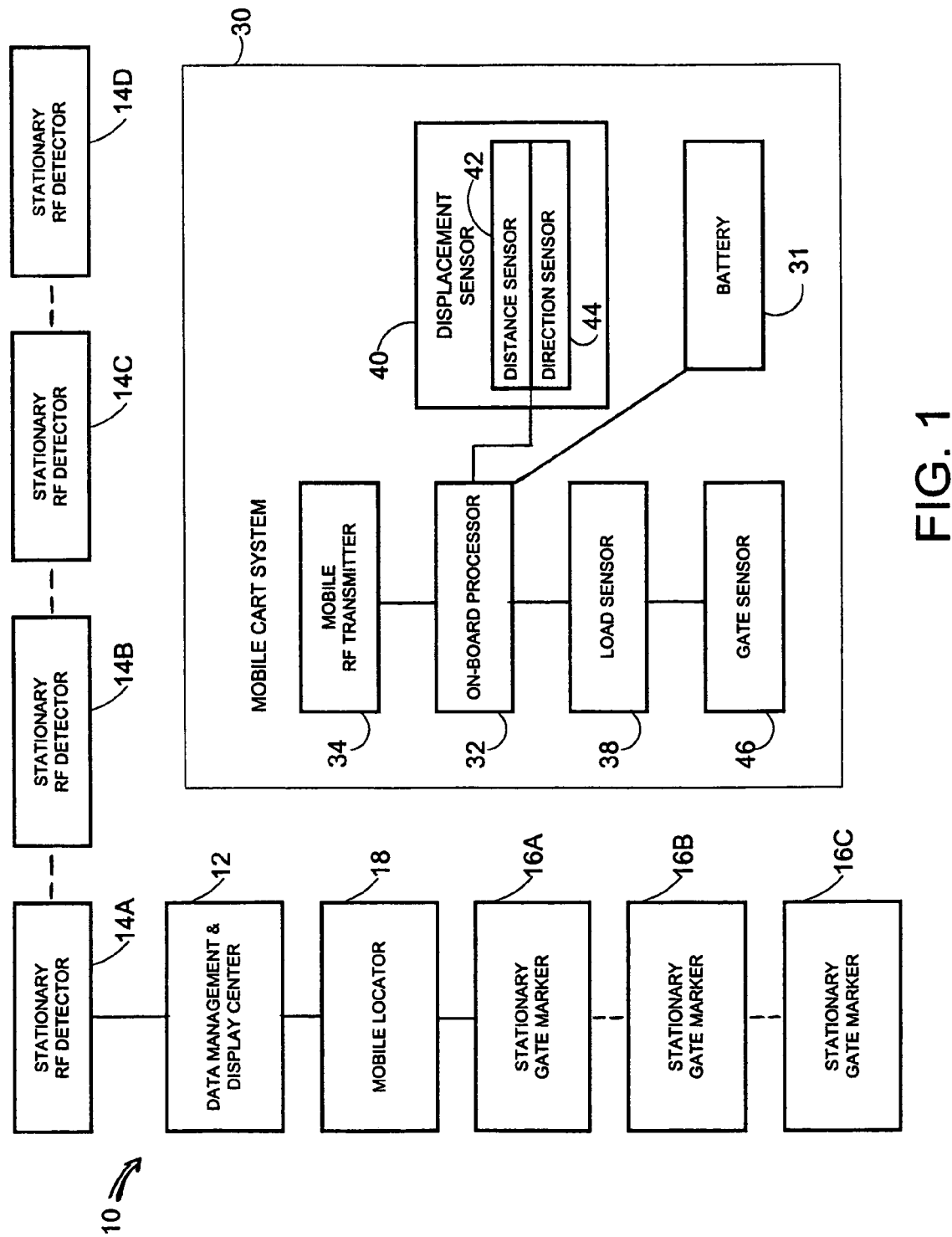
FIG. 1 is a block diagram of a cart fleet management system including a stationary system and a mobile cart system.

Referring to FIG. 1, a fleet cart management system includes a stationary system 10 and a mobile cart system 30. Stationary system 10 includes a data management and display center 12, several stationary RF detectors (i.e., RF receivers) 14A, 14B, 14C, . . . , 14N, stationary gate markers 16A, 16B, 16C, . . . 16N, and a mobile locator 18. Stationary RF receivers 14A, 14B, . . . 14N are located in and around an area including one or several buildings such as an airport, railway or bus station, a supermarket, or a shopping mall with a parking lot or a parking garage. Data management and display center 12 includes a computer system having a display, a CPU and an interface for communicating with stationary RF detectors 14A, 14B, 14C, . . . , 14N and stationary gate markers 16A, 16B, 16C, . . . 16N. Stationary gate markers 16A, 16B . . . 16A are located at elevators, escalators, entrances and exits to buildings and similar "gate locations."

Figure 3:
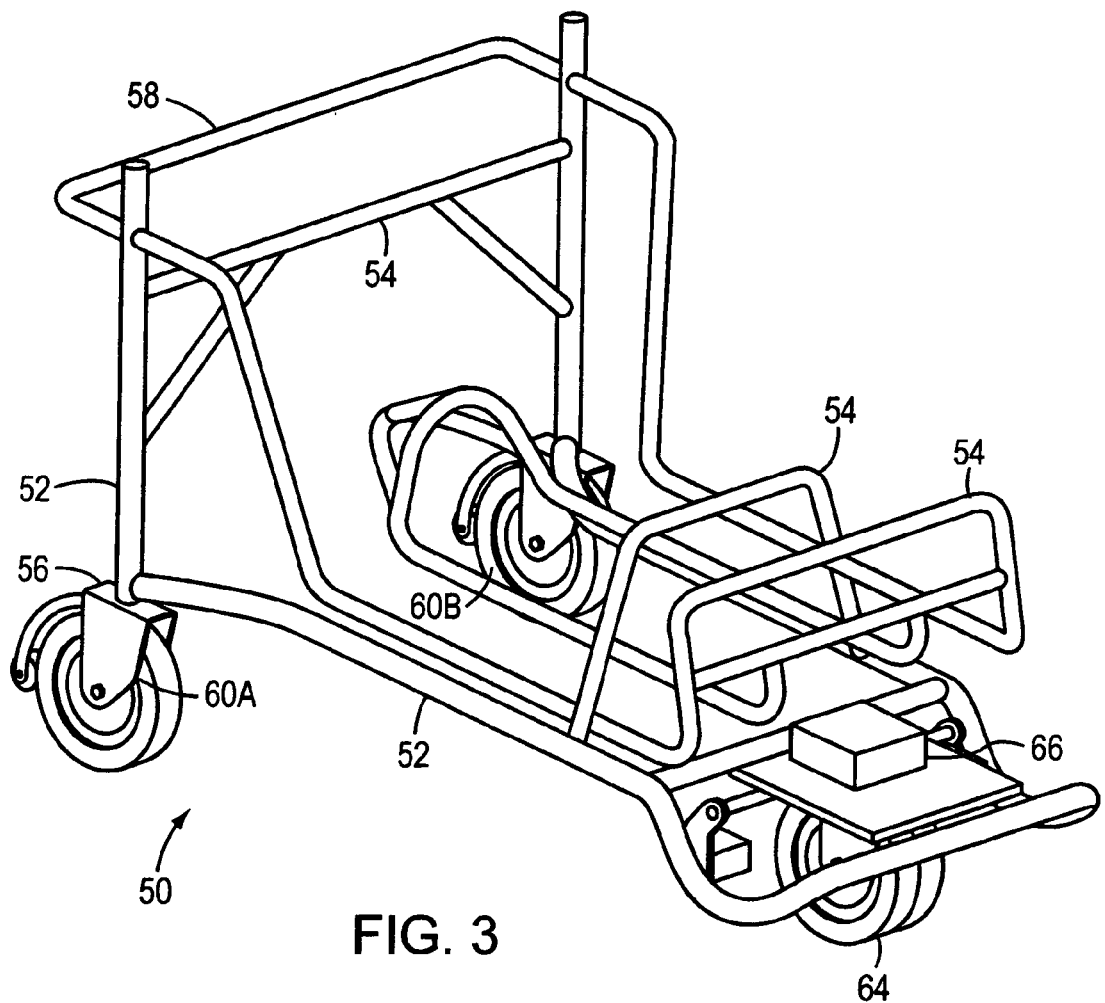
FIG. 3 shows schematically a luggage cart with a mobile cart sensor system.

Mobile cart system 30 includes a battery 31, an on-board processor 32, a mobile transmitter 34, a load sensor 38, a displacement sensor 40, and a gate sensor 46. Displacement sensor 40 includes a distance sensor 42 and a direction sensor 44. Mobile cart system 30 may also include other sensors such as an optical sensor, an impact sensor, a tilt sensor, a temperature sensor, a battery sensor, or a perimeter sensor. The entire mobile cart system 30 is located on a luggage cart 50 constructed and arranged for carrying luggage or packages. As shown in FIG. 3, luggage cart 50 includes a frame 52 having predominantly tubular construction connected to several transverse brace members 54 and connected to mounting structures 56 for mounting wheels 60. Luggage cart 50 also includes a pair of upright side support members connected to a handle 58 which is wide enough to enable easy manual control and cart steering by a person pushing cart 50. Each luggage cart 50 is identified by a unique identifier.

Figure 3A:
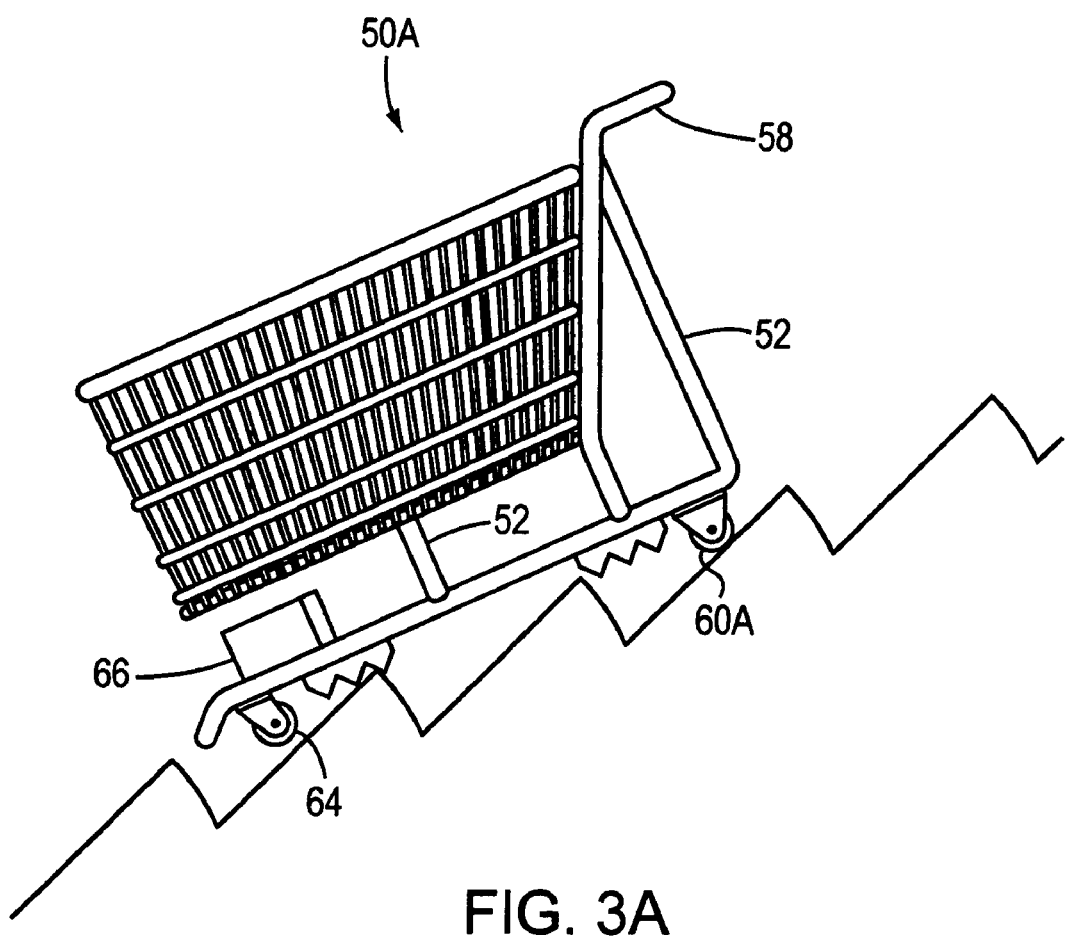
FIG. 3A shows schematically a shopping cart with a mobile cart sensor system.
Figure 4:
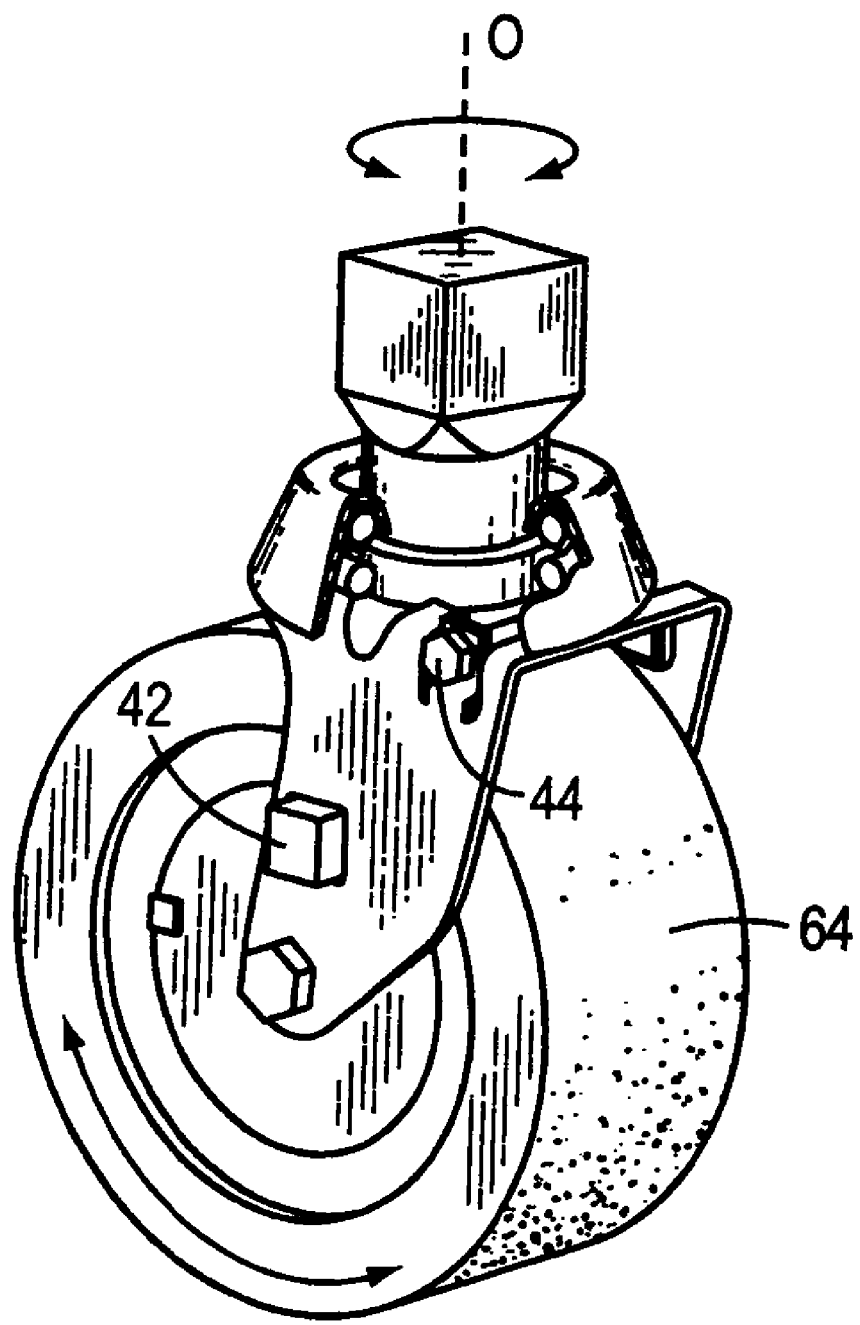
FIG. 4 illustrates a cart wheel of the luggage cart having a distance sensor and a direction sensor.

Luggage cart 50 is constructed and arranged for easy movement having a pair of primarily support wheels 60A and 60B and a front wheel 64 (a castor 64). Front wheel 64 is mounted on a rotary mounting apparatus enabling rotation about a generally vertical axis. Luggage cart 50 is constructed for nesting engagement with numerous carts of the same construction, which arrangement enables easy storage and transportation of numerous carts. The size of the primary support wheels 60A and 60B and the front wheel 64 (or castor 64) is selected depending on the particular application. In general, each of the primary support wheels is from about 4 inches to about 12 inches and preferably 8 inches. The diameter of the front wheel may be from about 2 inches to about 8 inches. In general, a single front wheel is much wider than the two rear wheels FIG. 3 shows schematically a luggage cart 50 with a mobile cart system 30 located in a plastic or another-type container 66. FIG. 3A illustrates schematically a shopping cart 50A with a mobile cart system 30 located in container 66. Shopping cart 50A is constructed and arranged for escalator use as described in any of the above cited patents. Mobile cart system 30 is an onboard tracking and use monitoring system. (For example, the complete cart system 30 is housed in an environmentally sealed engineering plastic encasement that is part of the front wheel mechanical assembly.)

System 30 communicates with one or multiple base units using the mobile RF transmitter having an effective range of 75–300 meters depending upon the surroundings. Therefore, the design and construction of the buildings, including elevators, escalators, walls, etc. determine the locations and spacing of RF receivers 14A, 14B, 14C, . . . , 14N.

In mobile cart system 30, processor 32 receives and stores usage data registered by load sensor 38, displacement sensor 40 or gate sensor 46. Processor 32 provides the usage data to mobile transmitter 34, which in turn transmits usage data and cart identification data to one or several stationary RF detectors 14A, 14B, 14C, . . . , 14N communicating with a stationary system 10. Stationary system 10 includes one or several computers used for data collection and display. For example, data management and display center 12 receives cart information (i.e., usage data and ID number for each cart), processes the data and provides it to a mapping system that keeps track of cart locations per each ID number.

Data management and display center 12 keeps track of the locations of individual luggage carts 50 and keeps track of their usage. Center 12 schedules maintenance of cart 50 based on the usage data; that is, the actual cart usage including the travel distance, load data, and optionally based on other data such as tilt sensor data or impact sensor data. The tilt sensor can provide information such as the number of times the cart traveled on an escalator. The impact sensor can provide information such as the number of times the cart was hit, e.g., by a car in a parking lot.

Data management and display center 12 generates a maintenance schedule designed to prevent breakdowns or catastrophic failures of the individual carts during use. Center 12 can take into account numerous factors such as a prior maintenance record of each monitored cart, the time from the last maintenance, weather conditions (e.g., there may be a different maintenance schedule for summer and winter where the cart is exposed to snow in a parking lot), and the usage (including misuse such as a cart being hit by a car or dropped down a stair case). The generated maintenance schedule can eliminate the cost associated with unnecessary maintenance or injuries caused by catastrophic failures.

Figure 2:
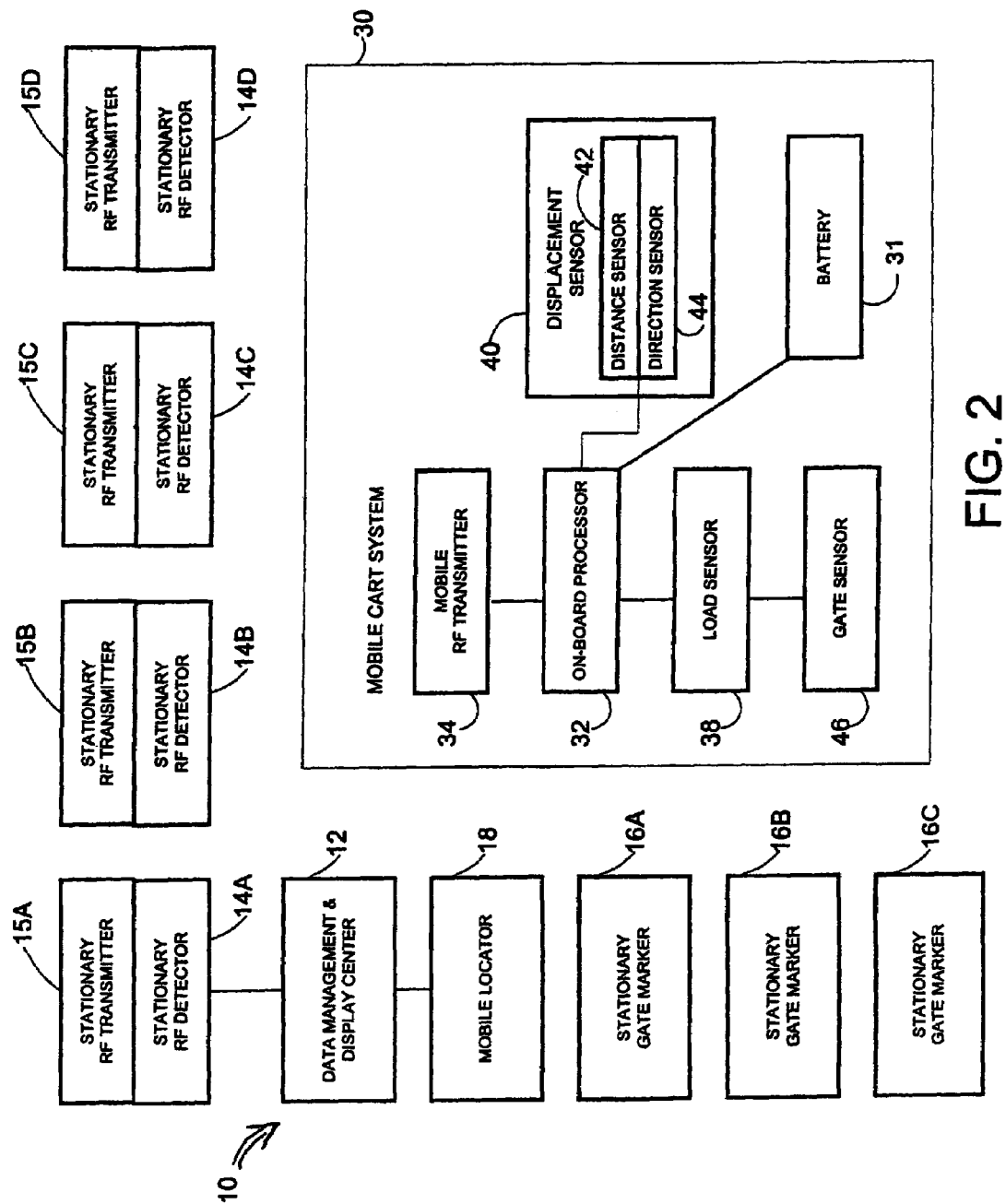
FIG. 2 is a block diagram of another embodiment of the cart fleet management system.

FIG. 2 illustrates another embodiment of the stationary system. As described above, stationary system 10 includes data management and display center 12, several stationary gate markers 16A, 16B, 16C, . . . 16N, a mobile locator 18 and several stationary RF transceivers, formed by receivers 14A, 14B, 14C, . . . , 14N, and the corresponding transmitters 15A, 15B, 15C, . . . 15N. As described above, stationary gate markers 16A, 16B . . . 16N are located at elevators, escalators, entrances and exits to buildings, and similar "gate locations." Mobile cart system 30 may also include a mobile transceiver instead of mobile transmitter 34.

Data management and display center 12 can provide a signal to mobile locator 18 (such as a Palm Pilot) carried by personnel searching for the luggage carts, servicing the stationary gate markers, the transceivers, or other related equipment. The Palm Pilot is programmed to receive data from any one of transmitters 15A, 15B, 15C, . . . 15N and display the data on its screen. Furthermore, the Palm Pilot may be programmed to send data to detectors 14A, 14B, 14C, . . . , 14N, which in turn communicate with data management and display center 12.

Each luggage or shopping cart includes displacement sensor 40 used for cart tracking. Displacement sensor 40 has distance sensor 42 and direction sensor 44 both of which may include rotary encoders mounted, for example, on front wheel 64 of cart 50. Front wheel 64 has two degrees of freedom designed to be tracked by the rotary encoders. The first encoder tracks the wheels forward and backward rolling motion that provides distance information and velocity information collected by processor 32. The second encoder tracks the rotation of the wheel's axel in respect to the cart frame. That is, the second rotary encoder provides information as to the left or right angular direction of luggage cart 50. Processor 32 receives and stores the information from both encoders. The rotary encoder may include a set of magnets distributed in a circular pattern on the wheel and a reed sensor. Alternatively, a suitable rotary sensor is described in U.S. Pat. No. 4,532,710 or 4,680,454, both of which are incorporated by reference.

Processor 32 also receives over time load data from load sensor 38, which may include a piezoelectric transducer, or a strain gauge mounted on the cart's frame. One or several strain gauges are attached at pressure locations and are monitored by the Wheatstone bridge. Specifically, the strain gauges are incorporated into the circuitry of the Wheatstone bridge. Due to a force being applied by the cargo (i.e., luggage, packages or even small children transported on the cart), the strain gauge either increases or decreases its length that in turn changes its electrical properties. The Wheatstone bridge measures the change in terms of resistance in the circuit.

Processor 32 also receives and stores gate data from gate sensor 46 identifying the corresponding gates where cart 50 traveled. Gate sensor 46 registers a gate signal from stationary gate markers 16A, 16B, 16C, . . . 16N. The gate markers are devices that are located at points within the airports (railway terminals or other buildings) including escalators, elevators, hall entrance and exit points, and parking entrance and exit points. A gate marker may be mounted on any existing gate structures, or on two small poles, or a flat plate mounted onto the floor on either side or underneath the path of the cart. Each detected gate signal may be used to correct of calibrate the data from displacement sensor 40.

For example, each of gate markers 16A, 16B, 16C, . . . 16N includes a light source (e.g., LED, light bulb or laser diode) that emits a light beam of a selected wavelength that preferably is out of the visible range. Gate sensor 46 includes a light detector with the corresponding filter arranged to detect the emitted light beam. The light source and the light detector are located and oriented in a way that gate sensor 46 registers the gate marker when crossing the gate. Furthermore, gate marker 16 may modulate the light beam to identify the location of the marker. That is, gate sensor 46 registers the modulated pattern and provides the corresponding gate data to processor 32. In turn, processor 32 stores a gate ID number, a direction of travel (e.g., including ON or OFF an elevator or escalator, or in or out of a building) and a time stamp.

Alternatively, gate marker 16 includes a low power RF emitter located on each pole or plate and directed at the cart path. Upon detection of cart passage, the gate marker is activated transmitting the gate's ID number and location information, which in turn will be received by the on-board RF receiver associated with the cart. According to yet another embodiment, gate marker 16 is replaced by a barcode scanner (or another type of automated scanner), and luggage cart 50 includes a barcode or another type or scanner ready identifier located to be read at the gate upon cart passage. The gate scanner then communicates with data management center 12 to provide the location, cart ID number, time and other information used for cart tracking and management. The use of the gate markers or gate scanners at various locations (exits, escalators, elevators, outlets) will provide information necessary to locate the carts at any point in time (e.g., in buildings, parking lots, floors).

The stationary system includes several transceivers (i.e., transmitters 15A, 15B, 15C, . . . 15N and receivers 14A, 14B, 14C, . . . , 14N) located throughout the airport (railway station, shopping mall, etc.), wherein the transceiver units (i.e., the data collection units) are placed in locations that ensure a high probability of data reception of data provided by mobile RF transmitter 34 located in mobile cart system 30. The received data is in turn transmitted via RF (the system of FIG. 2) or by a pre-wired cabling (the system of FIG. 1) to data management center 12. In each transmission, receivers 14A, 14B, 14C, . . . , 14N receive from mobile transmitter 34 a cart ID number, collected data from encoder 1 (i.e., distance sensor 42), collected data from encoder 2 (direction sensor 44), gate data (from gate sensor 46), load data (from load sensor 38), and any other stored data (e.g., from tilt sensor or impact sensor). Then, the stationary receiver (or transceiver) transmits the received data and its ID number to data management center 12. Data management center 12 calculates the location of each luggage cart within a radius accuracy (for example, 10 meters or better), the travel history of each luggage cart, the load history or total load of each cart, and any other relevant information that is used for maintenance, etc.

Mobile cart system 30 is powered by battery 31. Battery 31 comprises a lithium battery pack, for example, two 6VDC DL123 batteries, that provide sufficient electrical power to operate mobile cart system 30 for a period of several years (approximately 5–10 years). Mobile cart system 30 employs a unique cart power management algorithm that enables the cart module to function for a number of years on a set of batteries. Luggage cart 50 includes a power control unit that has an activation sensor. The activation sensor provides an initial detection of cart motion that in turn powers up the control unit (processor 32). The activation sensor (i.e., the power switch) may be a part of the reed sensor used as the rotary encoder. The control unit also employs a power management algorithm suitable for intermittent operation. The algorithm also directs transmission of data and "sleep mode" when there is no cart motion detection.

Stationary system 10 or mobile cart system 30 may include a pay unit that includes a bill or card reader, and an electro magnetic wheel lock system. If the cart fleet manager wishes to have a "pay" or "deposit-per-cart" system, the front wheel can be locked and opened by a signal from processor 32, which in turn communicates with a cart payment collection mechanism.

Stationary system 10 may also include a perimeter protection mechanism for immobilizing carts exiting a designated area or registering these carts and sounding alarm. The perimeter protection mechanism may provide a "lock" signal to processor 32 or directly to the electromagnetic wheel lock system of a cart exiting the designated area.

Having described various embodiments and implementations of the present invention, it should be apparent to those skilled in the relevant art that the foregoing is illustrative only and not limiting, having been presented by way of example only. There are other embodiments or elements suitable for the above-described embodiments, described in the above-listed publications, all of which are incorporated by referece as if fully reproduced herein. The functions of any one element may be carried out in various ways in alternative embodiments. Also, the functions of several elements may, in alternative embodiments, be carried out by fewer, or a single, element.

What is claimed is:

1. A hand operated cart constructed for carrying luggage or packages, comprising:
 a frame including a cargo area;
 cart wheels connected to said frame and connected to a handrail arranged for manually displacing said cart;
 a distance sensor constructed and arranged to measure a travel distance of said cart, wherein said distance sensor is coupled to one of said wheels and arranged to measure said travel distance based on rotation of said wheel;
 a direction sensor constructed and arranged to detect a travel direction of said cart; and
 an interface unit and a processor constructed to receive travel distance data from said distance sensor.

2. The hand-operated cart of claim 1 wherein said distance sensor includes a reed sensor mounted on said wheel.

3. The hand-operated cart of claim 1 wherein said direction sensor includes a rotary encoder operatively connected to one of said wheels.

4. The hand-operated cart of claim 1 further including a gate sensor cooperatively arranged with a gate marker located at a fixed location.

5. The hand-operated cart of claim 4 wherein said gate sensor provides to said processor gate data corresponding to said fixed gate marker location based on a signal from said gate marker.

6. The hand-operated cart of claim 5 wherein said gate marker emits an optical signal detected by said gate sensor located on said cart.

7. The hand-operated cart of claim 6 wherein said gate marker emits an electromagnetic signal detected by said gate sensor located on said cart.

8. The hand-operated cart of claim 1 further including an identifier associated with said cart and cooperatively arranged with a gate scanner located at a fixed location and constructed to register proximity of said cart at said fixed location.

9. The hand-operated cart of claim 8 wherein said identifier includes a barcode.

10. The hand-operated cart of claim 8 wherein said identifier includes a magnet.

11. The hand-operated cart of claim 1 wherein said interface unit includes a transmitter.

12. A system for managing multiple carts constructed for carrying luggage or packages, comprising:
 multiple carts each including a frame having a cargo area, cart wheels connected to said frame and connected to a handrail arranged for manually displacing said cart, a distance sensor constructed and arranged to measure a travel distance of said cart, an interface unit, and a processor constructed to receive travel distance data from said distance sensor;
 several base units arranged to receive distance data from said interface unit; and
 a computer system interfaced with said base units and arranged to schedule maintenance of said carts based on said received distance data.

13. The apparatus of claim 12 wherein said interface unit of said carts includes a transmitter and at least some of said base units include a receiver.

14. A method of scheduling maintenance of carts constructed for carrying luggage or packages, comprising:
 providing multiple carts including usage sensors;
 providing a base unit including a computer system arranged to receive data from said usage sensors;
 registering usage of said carts by said usage sensors;
 receiving by said computer system from an identified cart providing a usage signal and a cart identification signal; and
 scheduling maintenance of said identified cart based on said usage signal and selected criteria.

15. The method of scheduling maintenance according to claim 14 wherein at least one of said usage sensors includes a load sensor and a displacement sensor.

16. The method of scheduling maintenance according to claim 15 wherein at least one of said displacement sensors includes a distance sensor and a direction sensor.

17. The method of scheduling maintenance according to claim 15 wherein said displacement sensor further includes a gate sensor cooperatively arranged with a gate marker located at a fixed position at said area.

18. The method of scheduling maintenance according to claim 14 wherein receiving said usage signal includes receiving distance data corresponding to a travel distance of said cart over a selected time period.

19. The method of scheduling maintenance according to claim 14 wherein receiving said usage signal includes receiving load data corresponding to a load carded on said cart over a selected time period.

20. The method of scheduling maintenance according to claim 19 wherein said load data includes weight of said load.

21. The method of scheduling maintenance according to claim 14 wherein at least one of said usage sensors is constructed to transmit a signal to a remote location.

22. The method of scheduling maintenance according to claim 14 wherein said usage sensor is constructed to transmit a signal to several remote locations arranged to determine a location of said cart.

23. A method of locating carts constructed for carrying luggage or packages around an area, comprising:
 providing multiple carts including displacement sensors:
 providing a base unit including a computer system arranged to receive data from said displacement sensors;
 receiving by said computer system from an identified cart providing a displacement signal and a cart identification signal; and
 determining location of said identified cart in said area.

24. The method of locating carts according to claim 23 wherein said displacement sensor includes a distance sensor and a direction sensor.

25. The method of locating carts according to claim 24 wherein said displacement sensor further includes a gate sensor cooperatively arranged with a gate marker located at a fixed position at said area.

26. The method of locating carts according to claim 24 wherein said distance sensor is constructed and arranged to measure a distance said cart traveled in any direction.

27. The method of locating carts according to claim 24 wherein said direction sensor is constructed and arranged to provide orientation of movement of said cart in any travel direction.

28. An apparatus for scheduling maintenance of carts constructed for carrying luggage or packages, comprising:
multiple carts each including a frame having a cargo area, cart wheels connected to said frame and connected to a handrail arranged for manually displacing said cart, a usage sensor constructed and arranged to measure usage of said cart, an interface unit, and a processor constructed to receive usage data from said usage sensor;
several base units arranged to receive usage data from said interface unit located on one of said multiple carts; and
a computer system interfaced with said carts, said computer system being arranged to register said usage of each said cart; said computer system being arranged to schedule maintenance of an identified cart based on said usage signal and selected criteria.

29. The apparatus of claim 28 wherein said interface unit of said cart includes a transmitter.

30. The apparatus of claim 28 wherein said usage sensor includes a load sensor.

31. The apparatus of claim 28 further including an identifier associated with said cart.

32. The apparatus of claim 28 wherein said usage sensor includes a displacement sensor.

33. The apparatus of claim 32 wherein said displacement sensor includes a distance sensor.

34. The apparatus of claim 28 wherein said usage sensor includes an impact sensor.

35. The apparatus of claim 28 wherein said usage sensor includes a tilt sensor.

36. An apparatus for locating carts constructed for carrying luggage or packages around an area, comprising:
multiple carts each including a frame having a cargo area, cart wheels connected to said frame and connected to a handrail arranged for manually displacing said cart, a movement sensor constructed and arranged to measure movement of said cart, an interface unit, and a processor constructed to receive movement data from said movement sensor, each said interface unit being coupled to a transmitter located on said cart;
several base units each including a bass receiver arranged to receive movement data from said transmitter located on one of said multiple carts; and
a computer system interfaced with said base units, said computer system being arranged to register said movement data of each said cart; said computer system being arranged to locate an identified cart over a large area based on said movement data.

37. The apparatus of claim 36 wherein said cart further includes a load sensor.

38. The apparatus of claim 36 further including an identifier associated with said cart.

39. The apparatus of claim 36 wherein said cart further includes an impact sensor.

40. The apparatus of claim 36 wherein said cart further includes a tilt sensor.

* * * * *